June 15, 1943.  H. C. PORTER  2,322,157

MIXING DEVICE

Filed Jan. 18, 1941

INVENTOR
HOWARD C. PORTER
BY Williams, Bradbury & Hinkle
ATTORNEYS

Patented June 15, 1943

2,322,157

UNITED STATES PATENT OFFICE 2,322,157

MIXING DEVICE

Howard C. Porter, South Bend, Ind., assignor to Bendix Home Appliances, Inc., South Bend, Ind., a corporation of Delaware Application January 18, 1941, Serial No. 374,975

2 Claims. (Cl. 277—18)

This invention relates to mixing devices and more particularly to controllable valve mechanisms for mixing a plurality of fluids in any desired proportions.

One of the objects of the invention is to provide a mixing device for fluids in which the proportions of fluids can be adjusted at will and with which the flow can be shut off completely without varying or affecting the proportioning adjustment. According to one important feature the same valves which serve to control the protioning of the fluids also serve as shut-off valves.

Another object of the invention is to provide a mixing device in which cross flow of fluids is prevented. This is preferably accomplished by closing the inlets for the fluids to be mixed when the flow of mixed fluids is stopped to prevent flow from one inlet to the other.

Still another object of the invention is to provide a mixing device including a single control member for both varying the proportions of the fluids and for shutting off the flow. Preferably the control member is swingable in two planes, motion in one of which controls the proportioning and in the other of which controls the shutoff.

The above and other objects, advantages and novel features of the invention will be apparent from the following description when read in connection with the accompanying drawing, in which.

Figure 1:
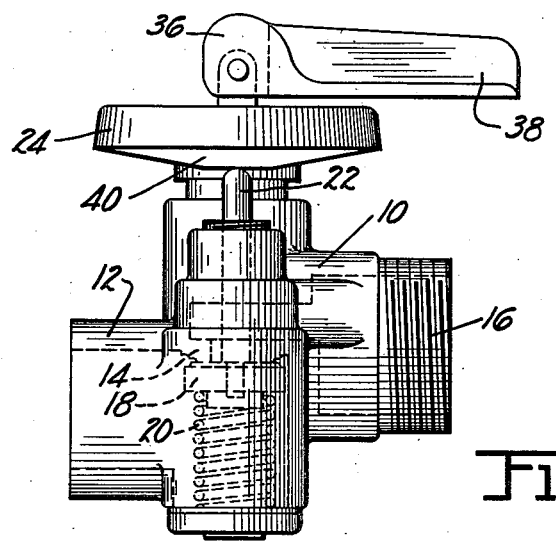
Figure 1 is a side elevation of a mixing device embodying the invention with parts shown in dotted lines.
Figures 2, 3:
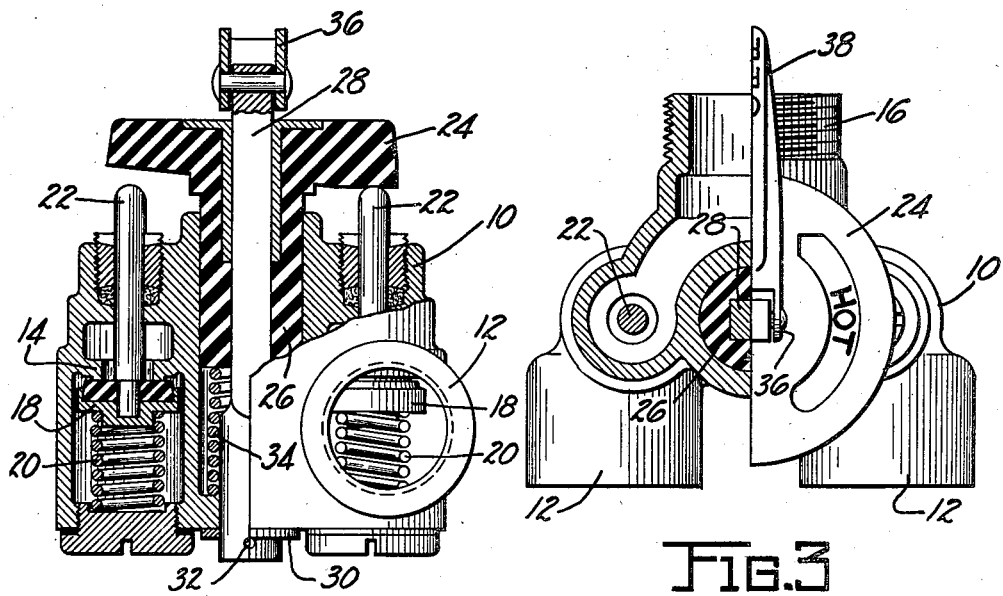
Figure 2 is a central section at right angles to Figure 1 with parts in elevation.
Figure 3 is a plan view of Figure 1 with parts in section.

The illustrated mixing device comprises a body 10 which may be cast or formed in any other desired manner with a pair of inlets 12 communicating through valve ports 14 with a common discharge passage 16. Each of the ports 14 is controlled by a poppet type valve 18 urged to its seat by a spring 20, and each of the valves has a stem 22 projecting above the top of the casing.

The valves 18 are controlled by a disk type cam 24 having a hub 26 rotatably received in a recess in the central portion of the body 10. The cam is provided with an axial passage therethrough receiving a guide stem or post 28, which is splined or otherwise non-rotatably connected to the cam hub. As shown, the stem 28 is square and slidably fits within a square opening in the hub 26. The post or stem 28 projects through the lower end of the casing and is secured therein against axial movement by means of a washer 30 and a cotter pin 32.

The cam 24 is urged outwardly away from the valve stems 22 by a coil spring 34 mounted in the body 10 and engaging the lower end of the hub 26. The cam is urged downwardly into engagement with the valve stems by a cam portion 36 at the end of an operating handle or lever 38, which is pivoted to the upper end of the guide stem or post 28. When the handle is turned to the position shown in the drawing the cam portion 36 moves away from the cam 24 and allows it to rise out of engagement with the valve stems 22 so that the valves may close under the influence of spring 20. If the handle 38 is moved to its opposite position about the pivotal connection to the post 28 the cam portion 36 thereof will engage the upper part of the cam 24 and move it downwardly against the valve stems 22 to unseat the valves. At this time fluids to be mixed, as for example, hot and cold water, may flow past the valves 18 into the discharge passage 16 where they will be mixed and will flow to the desired point of use.

For proportioning the fluids to be mixed, as in the case of hot and cold water to obtain the desired mixture temperature, the handle 38 may be swung in a horizontal plane about the post 28 to turn the post and with it the cam 24. It will be noted that the cam 24 is formed with one riser portion 40 engageable with one of the valve stems 22 so that the corresponding valve will be opened to a greater extent and at the same time the other valve lying on the opposite side of the cam disk 24 will be allowed to close to a greater extent. In this way any desired mixture can be obtained or the flow can be shut off completely by a manipulation of a single control handle in two planes of motion.

One important feature of the invention relates to the operation of the same inlet valve 18 both to vary the relative proportions of the fluid and to act as shut-off valves. This not only simplifies the structure but insures that no cross flow of fluids can occur when the flow of the mixed fluid is stopped as at this time both inlet pipes are closed and are separated from each other. It will further be noted that the lever 38 may be swung about its connection to the post 28 at any time to control shut off of the valves without affecting the proportioning adjustment.

While one embodiment of the invention has been shown and described in detail it will be understood that this is for illustration only and is not intended as a definition of the scope of the invention, reference being had for this purpose to the appended claims.

What is claimed is:

1. A mixing device comprising a body having inlet ports for a plurality of fluids to be mixed and an outlet passage for mixed fluids, valves controlling said inlet ports, and having parallel valve stems, springs holding said valves normally closed, a disc type valve operating cam rotatably and slidably supported in the body and engageable with the valve stems in all positions of rotation when slid toward the valve stems, a spring normally holding said disc cam away from contact with said valve stems, a guide pin rotatable but axially fixed in the body and keyed to the disc cam, a control handle pivoted to the guide pin to turn the pin and with it the disc cam, said handle having a handle cam portion to move said disc type valve operating cam axially into operating position in engagement with said valve stems when the handle is swung about its pivot, whereby said valve stems are relatively opened against the action of said springs for mixing said fluids on movement of said handle.

2. A mixing device comprising a body having inlet ports for a plurality of fluids to be mixed, valve seats in said body one for each inlet port, a valve head for each inlet port having parallel protruding valve stems, a spring for each valve head normally holding it on its seat, a disc cam guided in the body having a face for engagement with the ends of the valve stems, said face having a high portion and a low portion joined by gradually sloping portions for contacting said stems to open said valves against the action of said springs, a rotatable operating rod extending through the axis of the disc cam and slidably keyed to the disc cam, a handle for rotating the rod pivoted on the end thereof and having a cam surface provided with high and low portions for moving the disc cam toward the valve stems, a spring normally holding said disc away from said valve stems, the handle cam having substantially the same difference between its low and high portions as the difference between the low and high portions of the disc cam so that when the disc cam is rotated to a position of the greatest distance between either valve stem and one disc cam portion the movement of the handle cam through its widest range will open one and only one of the inlet ports and so that when the disc cam is rotated so that sloping surfaces between the high and low portions of the disc cam are opposite both valve stems the movement of the handle cam through its widest range will open both inlet ports.

HOWARD C. PORTER.